Aug. 1, 1944.   E. G. DOKE   2,354,802
FLOOR CLIP
Filed Oct. 2, 1941   2 Sheets-Sheet 1
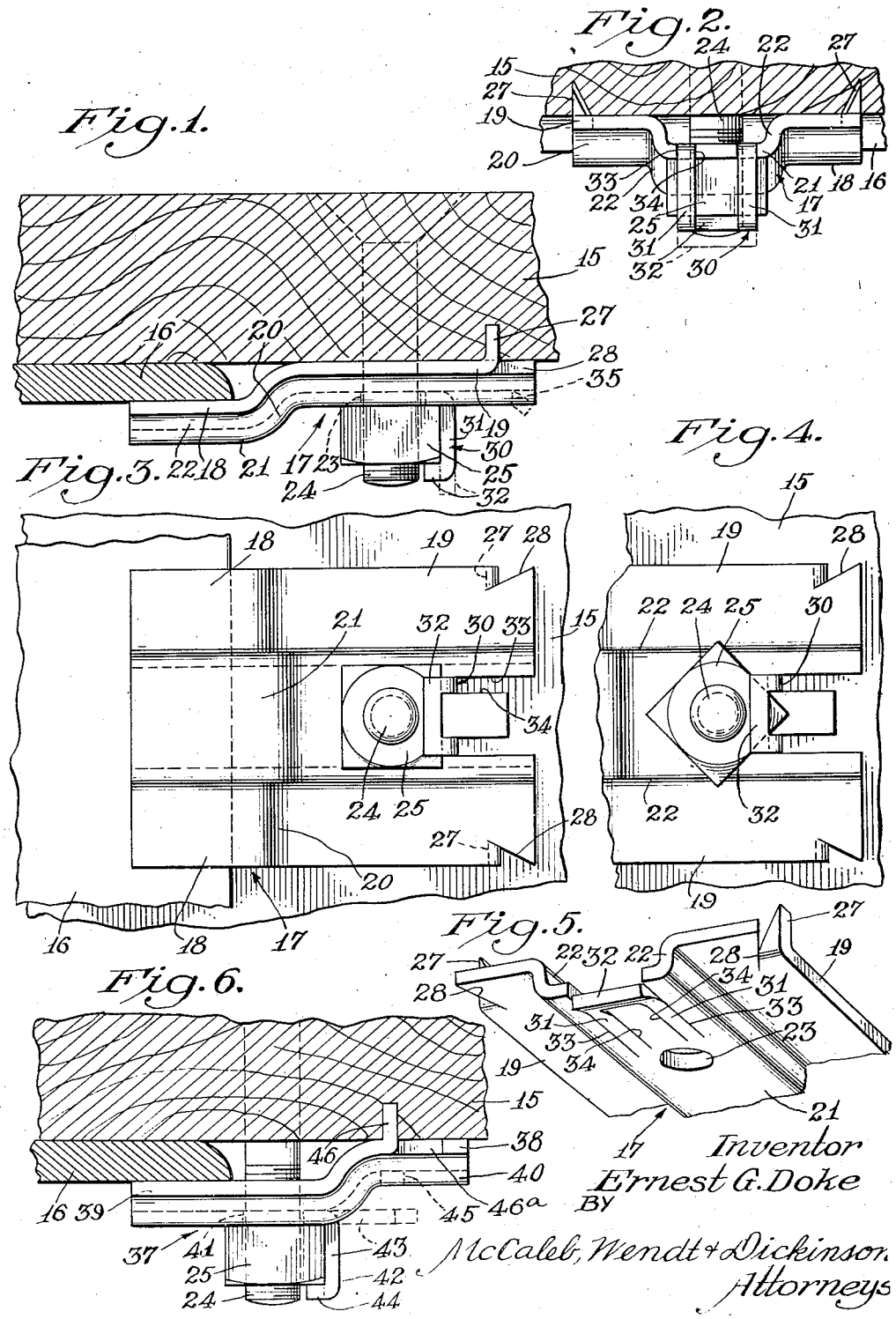
Inventor
Ernest G. Doke
BY
McCaleb, Wendt & Dickinson
Attorneys Aug. 1, 1944.  E. G. DOKE  2,354,802
FLOOR CLIP
Filed Oct. 2, 1941  2 Sheets-Sheet 2

Inventor
Ernest G. Doke
BY
McCaleb, Wendt & Dickinson
Attorneys.

Patented Aug. 1, 1944

2,354,802

UNITED STATES PATENT OFFICE 2,354,802

FLOOR CLIP

Ernest G. Doke, Chicago, Ill., assignor to Mac-Lean-Fogg Lock Nut Company, Chicago, Ill., a corporation of Illinois Application October 2, 1941, Serial No. 413,262

3 Claims. (Cl. 189—35)

This invention relates to floor clips and more particularly to clips of the type which are adapted for use in securing wooden floor boards to metal supporting frame structure such as the side and intermediate sills of railway car floors.

Such a clip is preferably formed with integral, bendable nut-locking means adapted to engage and prevent unintentional loosening of the tightened nut of the bolt by which the clip is fastened in place. In prior clips the nut-locking means will function effectively only if the lateral faces of the nuts are disposed in a predetermined relation thereto, for example, squared up for engagement of a flat face of the nut by the nut lock.

In keeping with efficient shop practice, the nuts of the fastening bolts are generally driven home by means of a power wrench. Such a wrench is adjusted as to the maximum tightening force it will deliver, and the point at which this maximum is reached as the nut is threaded home ordinarily varies somewhat with every nut driven due to the inevitable manufacturing inaccuracies and slight dimensional variations in the parts being secured together. This precludes accurate determination of how the faces of the tightened nut will finally be disposed with respect to the nut-locking means.

Heretofore it has been the time-consuming practice to follow up the power wrench with a hand wrench to square up the nut relative to the nut-locking means. That is, where the face of the nut nearest the nut-locking means has been left by the power wrench at an improper angle for effective engagement by the nut-locking means, or a corner of the nut has blocked applying of the nut-locking means, it has been necessary to give the nut an extra adjusting twist to accommodate the nut-locking means.

Since there are about two hundred or more floor clips used in a typical railway car installation, it is apparent that a great amount of time has been required merely for adjusting the fastening nuts before the nut locks could be bent into place.

The principal object of the present invention is to effect a substantial saving in the time required for installing the floor clips by eliminating the need for adjusting the tightening nuts to accommodate the nut-locking means.

Another object of my invention is to provide an improved floor securing clip having nut-locking means which is readily adaptable to any position assumed by the lateral faces of the tightened nut relative to the locking means.

Another object is to provide a nut-locking means of this kind which is adapted for use with various styles of floor clips.

Another object of the invention is to provide a nut-locking structure for floor securing clips which is adapted to enter into locking engagement with the end or bottom face of the nut of the fastening bolt.

Still another object of the invention is to provide a nut-locking structure for floor clips which is adapted to lock the fastening nut by engaging both its lateral and end faces.

Other objects and advantages will become apparent from the following description of specific embodiments of my invention and from the accompanying drawings illustrating the same, in which similar characters of reference indicate similar parts throughout the several views.

Referring to the drawings, of which there are two sheets:

Figure 1 is a fragmentary vertical sectional view taken through a railway car floor assembly showing in side elevation, a clip embodying the features of the invention;

Fig. 2 is an end elevational view looking toward the right end of the clip shown in Fig. 1;

Fig. 3 is a bottom plan view of the clip and adjacent portions of the floor structure;

Fig. 4 is a fragmentary bottom plan view of the clip and associated structure showing the nut of the fastening bolt in a different position than in the preceding views;

Fig. 5 is a fragmentary bottom perspective view of the clip showing the nut lock;

Fig. 6 is a fragmentary vertical sectional view taken through a railway car floor assembly showing a modified form of my clip in side elevation;

Figure 7:
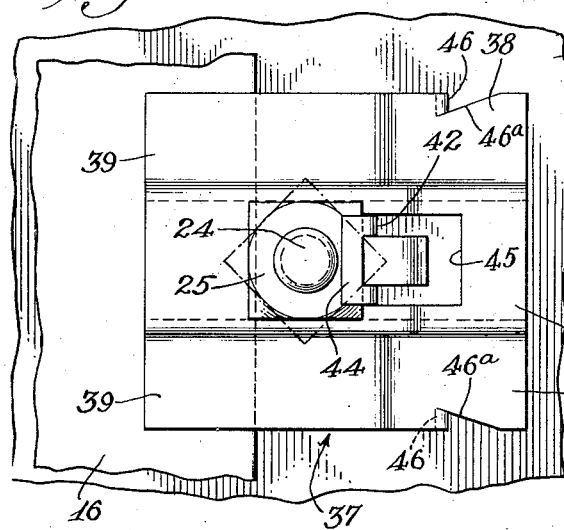
Fig. 7 is a bottom plan view of the modified clip of Fig. 6 and associated floor structure.

Referring to the drawings more in detail, the invention has been illustrated in connection with the particular parts of a railway car floor, namely, a floor board 15 and a supporting sill 16, which are adapted to be secured together by a floor clip. The sill 16 is in the form of a lateral horizontal flange of a standard angular metal shape forming one side or an intermediate member of the floor frame structure. The floor board 15 rests upon the sill 16 and presents a lower face portion beyond the edge of and in offset relation to the lower face of the sill.

In Figs. 1 to 5, inclusive, the features of the invention are embodied in a floor securing clip 17 which comprises an elongated body having a relatively short sill-engaging portion or flange 18 and a longer board-engaging portion or flange 19. These flanges are connected together integrally in offset relation by a bend 20 and are adapted to engage flatwise over a substantial bearing area with the respective offset lower faces of the sill 16 and the floor board 15.

The body of the clip 17 may be formed from relatively thin sheet metal stock and is reenforced by a channel-shaped rib 21 which extends centrally throughout the length of the clip. The rib has side walls 22 (Figs. 2 and 5) which are disposed as close as practicable at right angles to the face of the rib and to the laterally extending wing portions of the flanges 18 and 19 so as to be quite resistant to forces tending to bend the clip along transverse lines. An important advantage of this type of clip is that much lighter gauge stock may be used for the clip body than in an unreinforced clip.

One of the flanges of the clip 17, in this instance the board-engaging flange 19, has an aperture 23 through which is received the shank of a bolt 24 carried by and projecting downwardly from the floor board 15. A nut 25 is threaded onto the downwardly projecting end of the bolt 24 and is tightened up against the lower face of the rib 21 to draw the clip up tight against the lower faces of the floor board and the sill.

In order to hold the clip 17 against rotation about the axis of the bolt 24, prongs 27 may be formed thereon to project from the board-engaging flange 19 and be driven into the floor board 15 when the clip is drawn up tight thereagainst. In the present instance, the prongs 27 are made by cutting short diagonal slits 28 (Fig. 3) inwardly relative to the side edges at the corners of the flange 19 and bending up the partially severed narrow pointed side edge portions of the corners.

The nut 25 is locked against unintentionally turning loose by means comprising a bendable nutlock structure 30. The nut lock structure 30 includes a pair of elongated press-outs constituting narrow legs 31 which extend longitudinally of the clip 17 in spaced parallel relation and are both adapted to engage the same face of the nut 25.

The legs 31 have their base ends integral with the body of the clip adjacent the bolt aperture 23 but far enough therefrom in order to leave a substantial solid area for receiving the thrust of the nut 25. At their opposite ends the legs 31 are integrally joined by means of a narrow crossbar 32. Thus, the nut lock structure 30 has the appearance of a rectangular frame.

As seen in Fig. 5, each of the legs 31 is severed from the board flange end of the rib 21 along parallel lines 33 and 34. The lines of severance 33 may extend inwardly from the extreme end of the clip to points inwardly of the edge of the nut. The severance lines 34 are coextensive at their inner ends with the severance lines 33 and at their outer ends terminate short of the end of the clip a distance equivalent to the thickness of the cross-bar 32.

By this arrangement the outer edge of the crossbar 32 is formed by the end edge of the clip while the inner edge of the crossbar is formed by a line of severance 35 (Fig. 1) joining the ends of the lines of severance 34. By lengthening the board-engaging flange 19, the nut lock 30 could, of course, be cut therefrom without severing the end edge of the flange, as might be desirable under conditions where the clip must stand unusually severe strains and severance of the edge might be a fatal weakness.

If, perchance, after the nut 25 is driven home, one of its lateral faces lies at right angles transversely of the clip adjacent the nut lock 30 as seen in Figs. 1, 2 and 3, both of the legs 31 may be bent from the dot-dash position of Fig. 1 (full-line position of Fig. 5) into flatwise engagement with such face. Since the legs 31 are quite narrow and the material of the clip is relatively thin, the legs 31 are readily bendable into or out of the nut-locking position.

An important advantage of the ready bendability of the legs 31 and their proximity to one another is that they will easily adapt themselves to substantial variations in the transverse angularity of the engaged lateral face of the tightened nut. This means that the legs will both make locking contact with the lateral face of the nut even though it may be at a diagonal angle across the clip. In this the face will, of course, extend farther toward one of the legs 31 than the other and require uneven lengths of the two legs to be bent against it, which is permitted without damaging strain upon the nut lock structure as a unit because of the ease with which the legs may be bent. Furthermore, this feature of ready bendability of the legs 31 permits the nut lock to be rebent frequently for loosening and retightening of the nut 25 as it becomes necessary to release the floor clip to enable taking up shrinkage slack or making repairs in the floor.

Should the nut 25 be turned so that a corner of the nut extends between the legs 31 as shown in Fig. 4, the legs will engage the nut at opposite sides of the corner. This holds the nut against loosening just as effectively as where both legs engage a single face of the nut.

Any force exerted by the nut 25 tending to rotate it loose, is resisted not only by whichever one of the legs happens to be in the most effective locking engagement with the nut, but also by the other leg through the medium of the crossbar 32 which connects and therefore effects reinforcement of one leg by the other. Thus, although the resistance to turning of the nut afforded by the legs individually may at times not suffice because of their thinness, the combined resistance of the legs tied together by the crossbar 32 will meet all demands upon the nut lock 30.

Besides locking the nut 25 through the medium of the legs 31, the locking member 30 is also adapted to lock the nut in another manner supplemental to or independent of the locking function of the legs 31. Thus, the crossbar 32 preferably extends beyond the ends of the legs 31 sufficiently to be bent over if desired from the dot-dash outline position of Figs. 1 and 2 into engagement with the lower or end face of the nut 25, as shown in full lines. Inasmuch as the head structure of the bolt 24 may be held down and against turning by superimposed structure or by interengagement with the floor board, it holds the bolt shank against turning or upward movement. Consequently, the nut 25 must ride downwardly along the bolt shank as well as rotatively in order to turn loose. The crossbar 32 bearing against the end face of the nut will, therefore, act as a locking element holding the nut against rotation by preventing downward movement of the nut. Since the legs 31 extend at substantially right angles to both the clip body and the nut-locking crossbar 32, they provide practically solid anchors to hold the crossbar in fixed locking position.

By bending over of the crossbar 32, it assumes a position substantially at right angles to the legs 31 which increases its reenforcing effect in conjunction with the legs 31.

Figure 8:
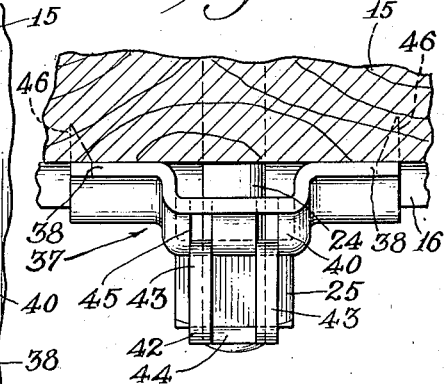
Fig. 8 is a fragmentary vertical sectional view showing the right-hand end of the modified clip of Figs. 6 and 7 in end elevation.

In the modified form of clip 37 shown in Figs. 6, 7 and 8, substantially the same features of the invention are present as in the floor clip 17. The principal differences in the floor clip 37 are the result of the style of this clip.

The clip 37 comprises a relatively short board-engaging flange 38 and a longer sill-engaging flange 39 which are disposed in offset relation corresponding to the offset of the lower faces of the floor board 15 and the sill 16. A relatively wide reenforcing rib 40 extends throughout the length of the longitudinal central portion of the clip. A bolt aperture 41 through the sill-flange portion of the rib 40 receives the fastening bolt 24 which, in this instance, is located substantially closer to the edge of the sill 16 than is the case where the clip 17 is used. Advantages of this style of floor clip are that it can be made shorter and that the thrust of the fastening nut is quite uniformly distributed to both flanges of the clip because the nut bears against a bridge at substantially the center of the clip between the member-engaging portions of the flanges.

The nut-locking means of the clip 37 are embodied in a frame type member 42 comprising narrow spaced parallel legs 43 integrally connected together at their ends by a crossbar 44. The form and operation of the nut lock member 42 are the same as already described with respect to the nut lock member 30. That is, the nut lock member 42 is adapted to lock the nut 25 irrespective of the position assumed by the lateral faces of the tightened nut.

As shown in Fig. 6 and in full line in Fig. 7, the legs 43 may engage a flat lateral face of the nut. However, as shown in dot-dash outline in Fig. 7, the nut lock 42 may straddle a corner of the nut, the legs 43 engaging at the opposite sides of the corner. The crossbar 44 may be bent into engagement with the lower or end face of the nut 25.

The nut lock member 42 could be severed from the sill-engaging flange 39 in much the same manner as the nut lock member 30 is severed from the board-engaging flange of the floor clip 17 but it is preferably severed from the board-engaging flange 15 and the connecting bend portion of the clip, substantially as shown. This locates the nut lock in a more convenient position for bending into or out of engagement with the nut 25. Initially the nut lock 42 may extend in the plane of the sill-flange rib portion with which it is integral, spaced from the board-engaging flange (dot-dash position shown in Fig. 6). This facilitates engagement of the nut lock by a bending tool.

Since the bolt aperture 41 is substantially removed from the end of the board-engaging flange 38, the lines along which the nut lock member 42 is cut from the clip body may be wholly within the body of the clip and need not go beyond the end edge of the board-engaging flange 38. As seen in Fig. 7, severance of the nut-locking member 42 leaves merely a substantially U-shaped aperture 45 in the body of the clip completely surrounded by solid portions of the body. This avoids any weakening of the body of the clip and in particular the board-engaging flange 38.

Rotation preventing prongs 46 may be struck up from the board-engaging flange 38 by partial severance of opposite side edge portions of the flange along diagonal lines 46ª extending inwardly a short distance from such edges. The prongs 46 extend upwardly from the flange 38 and are driven into the board as an incident to fastening the clip in place.

Where it is preferred to dispense with a crossbar connecting the legs of the nut-locking structure, the arrangement may be substantially as shown in the modified form of Figs. 9 to 12, inclusive. In this form of the invention a clip 47 has board-engaging and sill-engaging flanges 48 and 49, respectively. The board-engaging flange has a bolt hole 50.

Severed from the body of the clip 47, and preferably from the board-engaging flange portion thereof, is a pair of identical, independent nut-locking tongues 51 which extend in spaced parallel relation from adjacent the bolt aperture 50. The tongues 51 may be wider than the legs of the described nut-locking members 30 and 42, so as to be more self-sufficient in resisting loosening rotation of the nut lock 25. The spacing of the locking tongues 51 is preferably such as to enable engagement of both of the tongues with one lateral face of the nut.

The lines along which the tongues 51 are severed from the clip body may terminate short of the end edge of the clip so that the apertures 52 left in the clip body by severance of the tongues are entirely surrounded by solid portions of the clip body.

Figure 9:
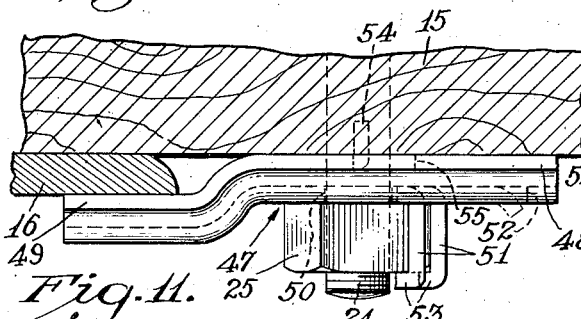
Figs. 9 and 10 are fragmentary vertical sectional views taken through a railway car floor assembly showing a further modified form of my clip in side and right-hand end elevations, respectively.
Figure 12:
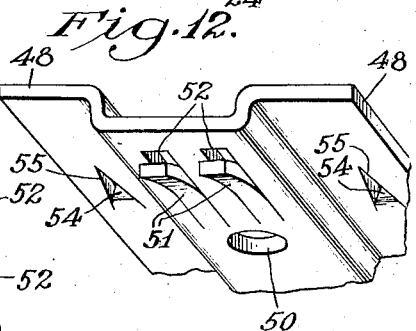
Fig. 12 is a fragmentary bottom elevational view of that end of the last-mentioned form of clip which carries the locking tongues.

In order to facilitate engagement of the tongues 51 by a bending tool, they may be initially bent down out of the plane of the clip body substantially as shown in full line in Fig. 12 and in dot-dash outline in Fig. 9.

Figure 10:
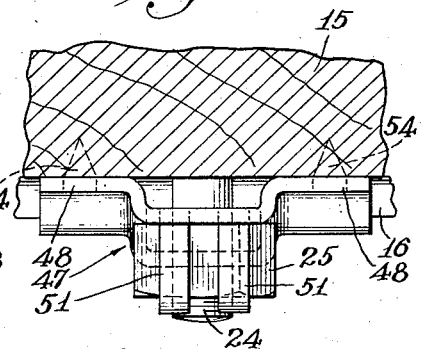
Figure 11:
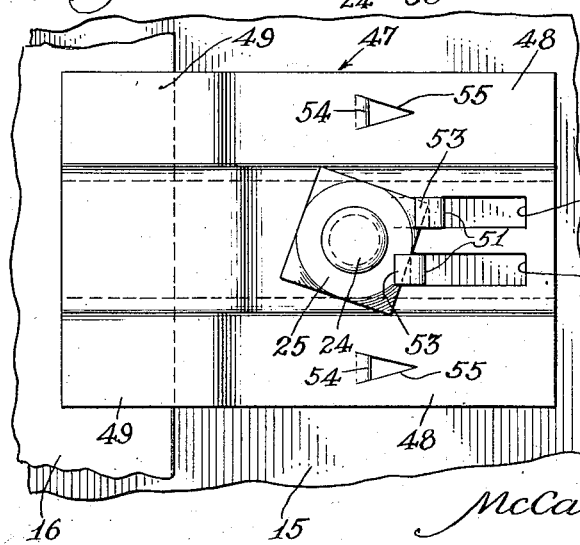
Fig. 11 is a bottom plan view of the modified form of clip of Figs. 9 and 10 and the associated floor structure.

After the nut 25 of the bolt 24 has been driven home, either one or both of the nut-locking tongues 51 may be bent into locking engagement with the nut. As an indication of the adaptability of the locking tongues to any position that the nut 25 may assume, the nut is indicated in Figs. 9, 10 and 11 as at an angular position which enables only one of the locking tongues to engage a lateral face of the nut while the other tongue, if it is desired to use the same, may engage only a corner of the nut which has come to rest directly on that particular tongue.

An advantage of at all times bending both of the locking tongues 51 into locking engagement with the nut 25 is that the ends of the tongues may be bent over to form right-angular locking elements 53 engaging the lower end face of the nut. Then the nut 25 is doubly held against loosening rotation, even though because of the position of the nut relative to the locking tongues 51 there might be a tendency of the nut to cam one or both of the tongues out of the way if the engagement of the tongues with a lateral surface of the nut were alone relied on for locking the nut. One of the reasons for the effectiveness of the locking elements 53 is that their associated tongues form anchors therefor which will not yield downwardly in the direction of the length of the tongues when the elements 53 are in locking position.

In order to hold the clip 47 against rotation about the bolt 24, the board-engaging flange 48 may have prongs 54 struck up therefrom after severance from the flange by means of substantially V-shaped cuts 55. One of the prongs 54 may be located adjacent to each side of the flange 48 and the base portions of the prongs are preferably transversely aligned with the bolt 24, so that in tightening the nut 25 relatively direct force is exerted for driving the prongs into the floor board 15.

From the foregoing it will be apparent that my invention avoids any need for squaring up or adjusting the position of the lateral faces of the fastening nut of the floor clip in order to secure proper locking engagement of the nut. My novel nut-locking means readily adapts itself to any position relative thereto of the faces of the tightened nut. Moreover, the invention provides the unique feature of locking the nut by engagement of its lower or end face with a nut lock extending from the member which is secured by the nut.

While I have illustrated and described certain preferred embodiments of my invention, it is to be understood that I do not thereby intend to limit my invention to the specific forms disclosed, but contemplate that many modifications and alternative constructions or substitutions may be made without departing from the scope and spirit of my invention.

I claim:

1. A sheet metal floor clip comprising integrally connected offset sill-engaging ends and a longitudinal stiffening rib which is spaced from each of the longitudinal edges of the clip and formed to lie away from the sill and board engaged by the clip; a bolt hole in the rib at a point substantially spaced from each of its ends; and a pair of spaced apart elongated nut-locking press-outs integral with the rib and joining the latter only at points adjacent to the bolt hole, said nut-locking press-outs lying wholly on one side of, and projecting at right angles away from, a line extending diametrically of the bolt hole and transversely of the rib, said nut-locking press-outs being cut wholly from the material of the rib and being adapted to be turned away from the plane of their contiguous portion of the rib to engage a side or sides of a nut threaded upon a bolt occupying the bolt hole.

2. A sheet metal floor clip comprising integrally connected offset sill-engaging and board-engaging ends and a longitudinal stiffening rib which is spaced from each of the longitudinal edges of the clip and formed to lie away from the sill and board engaged by the clip; a bolt hole in the rib at a point substantially spaced from each of its ends; a pair of spaced apart elongated nut-locking press-outs integral with the rib and joining the latter only at points adjacent to the bolt hole, said nut-locking press-outs lying wholly on one side of, and projecting at right angles away from, a line extending diametrically of the bolt hole and transversely of the rib; and a lug also integral with the rib and merging into the latter at a point closely adjacent to the bolt hole; said nut-locking press-outs being cut wholly from the material of the rib and being adapted to be turned away from the plane of their contiguous portion of the rib to engage a side or sides of a nut threaded upon a bolt occupying the bolt hole, and said lug constituting a bolt hole margin extension projecting into the space between the two nut-locking press-outs.

3. A sheet metal floor clip comprising integrally connected offset sill-engaging and board-engaging ends and a longitudinal stiffening rib which is spaced from each of the longitudinal edges of the clip and formed to lie away from the sill and board engaged by the clip; a bolt hole in the rib at a point substantially spaced from each of its ends; a pair of spaced apart elongated nut-locking press-outs integral with the rib and joining the latter only at points adjacent to the bolt hole, said nut-locking press-outs lying wholly on one side of, and projecting at right angles away from, a line extending diametrically of the bolt hole and transversely of the rib, said nut-locking press-outs being cut wholly from the material of the rib and being adapted to be turned away from the plane of their contiguous portion of the rib to engage a side or sides of a nut threaded upon a bolt occupying the bolt hole; and a narrow cross bar integral with and connecting those ends of the nut-locking press-outs which lie away from the rib.

ERNEST G. DOKE.